US011901512B2

United States Patent
Kozel et al.

(10) Patent No.: US 11,901,512 B2
(45) Date of Patent: Feb. 13, 2024

(54) ELECTROLYTE COMPRISING A PHOSPHITE AS AN ADDITIVE OR CO-SOLVENT, LITHIUM RECHARGEABLE BATTERY COMPRISING SAID ELECTROLYTE, AND METHOD FOR PRODUCING THE PHOSPHITE

(71) Applicants: FORSCHUNGSZENTRUM JUELICH GMBH, Juelich (DE); CONSTRUCTOR UNIVERSITY BREMEN GGMBH, Bremen (DE)

(72) Inventors: Volodymyr Kozel, Bremen (DE); Natascha Von Aspern, Braunschweig (DE); Gerd-Volker Roeschenthaler, Bremen (DE); Martin Winter, Muenster (DE); Olesya Stubbmann-Kazakova, Bassum (DE); Isidora Cekic-Laskovic, Muenster (DE); Christian Woelke, Muenster (DE)

(73) Assignees: FORSCHUNGSZENTRUM JUELICH GMBH, Juelich (DE); CONSTRUCTOR UNIVERSITY BREMEN GGMBH, Bremen (DE)

(*) Notice: Subject to any disclaimer, the term of this patent is extended or adjusted under 35 U.S.C. 154(b) by 592 days.

(21) Appl. No.: 17/257,857

(22) PCT Filed: Jul. 5, 2019

(86) PCT No.: PCT/DE2019/200071
§ 371 (c)(1),
(2) Date: Jan. 5, 2021

(87) PCT Pub. No.: WO2020/007425
PCT Pub. Date: Jan. 9, 2020

(65) Prior Publication Data
US 2021/0273263 A1    Sep. 2, 2021

(30) Foreign Application Priority Data

Jul. 6, 2018   (DE) .................... 10 2018 116 475.0

(51) Int. Cl.
H01M 10/0569 (2010.01)
H01M 10/0525 (2010.01)
H01M 10/0567 (2010.01)

(52) U.S. Cl.
CPC ... H01M 10/0569 (2013.01); H01M 10/0525 (2013.01); H01M 10/0567 (2013.01); *H01M 2300/0028* (2013.01)

(58) Field of Classification Search
CPC ........ H01M 10/0569; H01M 10/0525; H01M 10/0567; H01M 2300/0028; H01M 10/0568; H01M 6/16; Y02E 60/10
See application file for complete search history.

(56) References Cited

U.S. PATENT DOCUMENTS 5,830,600 A    11/1998   Narang et al.
8,062,796 B2   11/2011   Yoon et al.
(Continued)

FOREIGN PATENT DOCUMENTS

DE           697 28 041 T2     10/2004
DE    10 2015 225 697 A1      1/2017
(Continued)

OTHER PUBLICATIONS

K. Xu: "Nonaqueous Liquid Electrolytes for Lithium-Based Rechargeable Batteries", Chem. Rev. 2004, vol. 104, pp. 4303-4417 (2004).
(Continued)

*Primary Examiner* — Abdullah A Riyami
*Assistant Examiner* — Nader J Alhawamdeh
(74) *Attorney, Agent, or Firm* — Norman B. Thot

(57) ABSTRACT

An electrolyte includes at least one lithium salt, at least one first organic solvent having a dielectric constant of >90 at
(Continued)

40° C., at least one second organic solvent having a boiling point of <110° C., and at least one phosphite having the formula (I)

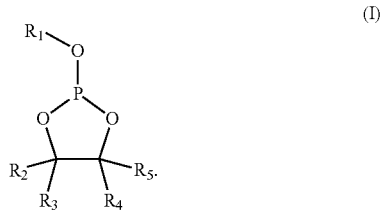

R₁ is selected from an n-propoxy group, an iso-propoxy group, a tert-butoxy group, an n-pentafluoropropoxy group, an n-trifluoropropoxy group, an iso-hexafluoropropoxy group, or a tert-nonafluorobutoxy group. $R_2$, $R_3$, $R_4$, and $R_5$ are each selected, independently of one another, from H, a trifluoromethyl group, or a $C_2$-$C_6$-alkyl group which is substituted with a trifluoromethyl group.

10 Claims, 1 Drawing Sheet

(56) References Cited

U.S. PATENT DOCUMENTS

| | | | |
|---|---|---|---|
| 9,843,074 B2* | 12/2017 | Röschenthaler | C07C 309/65 |
| 9,905,885 B2* | 2/2018 | Kalinovich | H01M 10/0567 |
| 2006/0024577 A1 | 2/2006 | Schwake | |
| 2007/0048622 A1 | 3/2007 | Yoon et al. | |
| 2013/0330609 A1* | 12/2013 | Sawa | H01M 10/0525 429/188 |
| 2015/0188191 A1* | 7/2015 | Kalinovich | H01M 10/0569 429/188 |
| 2017/0018806 A1 | 1/2017 | Shin et al. | |
| 2017/0288263 A1* | 10/2017 | Ma | H01M 10/052 |
| 2021/0273263 A1* | 9/2021 | Kozel | H01M 6/16 |

FOREIGN PATENT DOCUMENTS

| | | |
|---|---|---|
| EP | 0 906 641 B1 | 3/2004 |
| WO | WO 97/44842 A1 | 11/1997 |
| WO | WO 03/081620 A1 | 10/2003 |

OTHER PUBLICATIONS

K. Xu: "Electrolytes and Interphases in Li-Ion Batteries and Beyond", Chemical Reviews, vol. 114, pp. 11503-11618 (2014).
X. Zheng et al.: "Enhancing the High-Voltage Cycling Performance of LiNi₁/₃Co₁/₃Mn₁/₃O₂/Graphite Batteries Using Alkyl 3,3,3-Trifluoropropanoate as an Electrolyte Additive", ACS Applied Materials & Interfaces, vol. 9, pp. 18758-18765 (2017).
S. Kim et al.: "Quercetin as electrolyte additive for LiNi₀.₅Mn₁.₅O₄ cathode for lithium-ion secondary battery at elevated temperature", Journal of Power Sources, vol. 336, pp. 316-324 (2016).
L. Wang et al.: "1,3,6-Hexanetricarbonitrile as electrolyte additive for enhancing electrochemical performance of high voltage Li-rich layered oxide cathode", Journal of Power Sources, vol. 361, pp. 227-236 (2017).
Y. Ji et al.: "Toward a stable electrochemical interphase with enhanced safety on high-voltage LiCoO₂ cathode: A case of phosphazene additives", Journal of Power Sources, vol. 359, pp. 391-399 (2017).
F.-M. Wang et al.: „Robust Benzimidazole-Based Electrolyte Overcomes High-Voltage and High-Temperature Applications in 5 V Class Lithium Ion Batteries, Chemistry of Materials, vol. 29, pp. 5537-5549 (2017).
H. Rong et al.: "A novel imidazole-based electrolyte additive for improved electrochemical performance of high voltage nickel-rich cathode coupled with graphite anode lithium ion battery", Journal of Power Sources, vol. 332, pp. 312-321 (2016).
H. Rong et al.: "A novel imidazole-based electrolyte additive for improved electrochemical performance at elevated temperature of high-voltage LiNi₀.₅Mn₁.₅O₄ cathodes", Journal of Power Sources, vol. 329, pp. 586-593 (2016).
P. Hong et al.: "Effect of ethylene glycol bis (propionitrile) ether (EGBE) on the performance and interfacial chemistry of lithium-rich layered oxide cathode", Journal of Power Sources, vol. 329, pp. 216-224 (2016).
H. Lee et al.: "Dopamine as a Novel Electrolyte Additive for High-Voltage Lithium-Ion Batteries" ACS Applied Materials & Interfaces, pp. A-G (2016).
X. Zheng et al.: "3, 3'-sulfonyldipropionitrile: A novel electrolyte additive that can augment the high-voltage performance of LiNi₁/₃Co₁/₃Mn₁/₃O₂/graphite batteries", Journal of Power Sources, vol. 319, pp. 116-123 (2016).
R. Chen et al.: "An investigation of functionalized electrolyte using succinonitrile additive for high voltage lithium-ion batteries", Journal of Power Sources, vol. 306, pp. 70-77 (2016).
L. Xia et al.: "A novel fluorocyclophosphazene as bifunctional additive for safer lithium-ion batteries", Journal of Power Sources, vol. 278, pp. 190-196 (2015).
L. Wang et al.: "Improved high-voltage performance of LiNi₁/₃Co₁/₃Mn₁/₃O₂ cathode with Tris(2,2,2-trifluoroethyl) phosphite as electrolyte additive", Electrochimica Acta, vol. 243, pp. 72-81 (2017).
N. Von Aspern et al.: "Phosphorus additives for improving high voltage stability and safety of lithium ion batteries", Journal of Fluorine Chemistry, vol. 198, pp. 24-33 (2017).
A. Tornheim et al.: "The Role of Additives in Improving Performance in High Voltage Lithium-Ion Batteries with Potentiostatic Holds", Journal of the Electrochemical Society, vol. 164, pp. A6366-A6372 (2017).
K. Wang et al.: "A comparative study of Si-containing electrolyte additives for lithium ion battery: Which one is better and why is it better", Journal of Power Sources, vol. 342, pp. 677-684 (2017).
R. Wagner et al.: "Impact of Selected LiPF Hydrolysis Products on the High Voltage Stability of Lithium-Ion Battery Cells", ACS Applied Materials & Interfaces, pp. 1-27 (2016).
Z. Zhou et al.: "Triphenyl phosphite as an electrolyte additive to improve the cyclic stability of lithium-rich layered oxide cathode for lithium-ion batteries", Electrochimica Acta, vol. 216, pp. 44-50 (2016).
J. Xu et al.: "Facilely solving cathode/electrolyte interfacial issue for high-voltage lithium ion batteries by constructing an effective solid electrolyte interface film", Electrochimica Acta, vol. 191, pp. 687-694 (2016).
Y.-M. Song et al.: "Exploiting chemically and electrochemically reactive phosphite derivatives for high-voltage spinel LiNi₀.₅Mn₁.₅O₄ cathodes", Journal of Power Sources, vol. 302, pp. 22-30 (2016).
Y.-K. Han et al.: "Why is tris(trimethylsilyl) phosphite effective as an additive for high-voltage lithium-ion batteries?", Journal of Materials Chemistry A, vol. 3, pp. 10900-10909 (2015).
H. Rong et al.: "Performance improvement of graphite/LiNi₀.₄Co₀.₂Mn₀.₄O₂ battery at high voltage with added Tris (trimethylsilyl) phosphate", Journal of Power Sources, vol. 274, pp. 1155-1161 (2015).
H. Cai et al.: "Improving High-Voltage Performance of Lithium-Ion Batteries with Sulfolane as an Electrolyte Additive", Journal of the Electrochemical Society, vol. 164 (4), pp. A714-A720 (2017).
Y.-S. Kang et al.: „Tetrathiafulvalene as a conductive film-making additive on high-voltage cathode, ACS Applied Materials & Interfaces, pp. 1-25 (2017).
S. H. Lim et al.: "Insight into the electrochemical behaviors of 5V-class high-voltage batteries composed of lithium-rich layered oxide with multifunctional additive", Journal of Power Sources, pp. 1-10 (2016).
M. Zhao et al.: "Diphenyl disulfide as a new bifunctional film-forming additive for high-voltage LiCoO₂/graphite battery charged to 4.4 V", Journal of Power Sources, vol. 323, pp. 29-36 (2016).

(56) References Cited

OTHER PUBLICATIONS

X. Zheng et al.: "High-voltage performance of $LiNi_{1/3}Co_{1/3}Mn_{1/3}O_2$/graphite batteries with di(methylsulfonyl) methane as a new sulfone-based electrolyte additive", Journal of Power Sources, vol. 293, pp. 196-202 (2015).
W. Huang et al.: A novel electrolyte additive for improving the interfacial stability of high voltage lithium nickel manganese oxide cathode, Journal of Power Sources, vol. 293, pp. 71-77 (2015).
Z. Wang et al.: "Triethylborate as an electrolyte additive for high voltage layered lithium nickel cobalt manganese oxide cathode of lithium ion battery", Journal of Power Sources, vol. 307, pp. 587-592 (2016).
X. Wang et al.: "Improving cyclic stability of lithium cobalt oxide based lithium ion battery at high voltage by using trimethylboroxine as an electrolyte additive", Electrochimica Acta, vol. 173, pp. 804-811 (2015).
J. Li et al.: "Tris(trimethylsilyl)borate as an electrolyte additive for improving interfacial stability of high voltage layered lithium-rich oxide cathode/carbonate-based electrolyte", Journal of Power Sources, vol. 285, pp. 360-366 (2015).
L. Imholt et al.: "Trimethylsiloxy based metal complexes as electrolyte additives for high voltage application in lithium ion cells", Electrochimica Acta, vol. 235, pp. 332-339 (2017).
T. J. Lee et al.: "Tris(pentafluorophenyl)silane as an Electrolyte Additive for 5 V $LiNi_{0.5}Mn_{1.5}O_4$ Positive Electrode", Journal of the Electrochemical Society, vol. 163 (6), pp. A898-A903 (2016).
J. Chen et al.: "Improving the electrochemical performance of high voltage spinel cathode at elevated temperature by a novel electrolyte additive", Journal of Power Sources, vol. 303, pp. 41-48 (2016).
Y. Dong et al.: "Effect of Lithium Borate Additives on Cathode Film Formation in $LiNi_{0.5}Mn_{1.5}O_4$/Li Cells", ACS Applied Materials & Interfaces, vol. 9, pp. 20467-20475 (2017).
Y. Dong et al.: Improving the Performance at Elevated Temperature of High Voltage Graphite/$LiNi_{0.5}Mn_{1.5}O_4$ Cells with Added Lithium Catechol Dimethyl Borate, Journal of the Electrochemical Society, vol. 164 (2), pp. A128-A136 (2017).
Y. Kaneko et al.: Cathode solid electrolyte interface's function originated from salt type additives in lithium ion batteries, Electrochimica Acta, pp. 271-279 (2016) (Accepted Manuscript submitted).
M. Xu et al.: "Development of Novel Lithium Borate Additives for Designed Surface Modification of High Voltage $LiNi_{0.5}Mn_{1.5}O_4$ Cathodes", Energy & Environmental Science, pp. 1-14 (2016).
M. Xu et al.: "Improved Performance of High Voltage Graphite/$LiNi_{0.5}Mn_{1.5}O_4$ Batteries with Added Lithium Tetramethyl Borate", ECS Electrochemistry Letters, vol. 4 (8), pp. A83-A86 (2015).
Z. Zeng et al.: "Bis(2,2,2-trifluoroethyl) methylphosphonate: An Novel Flame-retardant Additive for Safe Lithium-ion Battery", Electrochimica Acta, vol. 129, pp. 300-304 (2014).
J. Zheng et al.: "Novel high phosphorus content phosphaphenanthrene-based efficient flame retardant additives for lithium-ion battery", J Therm Anal Calorim, vol. 117, pp. 319-324 (2014).
P. Murmann et al.: "Influence of the Fluorination Degree of Organophosphates on Flammability and Electrochemical Performance in Lithium Ion Batteries: Studies on Fluorinated Compounds Deriving from Triethyl Phosphate", Journal of the Electrochemical Society, vol. 163 (5), pp. A751-A757 (2016).
X. Mönnighoff et al.: "Post-Mortem Investigtions of Fluorinated Flame Retardants for Lithium Ion Battery Electrolytes by Gas Chromatography with Chemical Ionization", Electrtochimica Acta, vol. 246, pp. 1042-1051 (2017).
S. Takeda et al.: "Identification and formation mechanism of individual degradation products in lithium-ion batteries studied by liquid chromatography/electrospray ionization mass spectrometry and atmospheric solid analysis probe mass spectrometry", Rapid Communications in Mass Spectrometry, vol. 30, pp. 1754-1762 (2016).
W. Weber et al.: "Identification of alkylated phosphates by gas chromatography-mass spectrometric investigations with different ionization principles of a thermally aged commercial lithium ion battery electrolyte", Journal of Chromatography A, vol. 1394, pp. 128-136 (2015).
D. Gao et al.: "Ethylene ethyl phosphate as a multifunctional electrolyte additive for lithium-ion batteries", RSC Advances, vol. 5, pp. 17566-17571 (2015).
H. Ota et al.: "Effect of cyclic phosphate additive in non-flammable electrolyte", Journal of Power Sources, vol. 119-121, pp. 393-398 (2003).
T. Wolf et al.: "A Library of Well-Defined and Water-Soluble Poly(alkyl phosphonate)s with Adjustable Hydrolysis", Macromolecules, vol. 48, pp. 3853-3863 (2015).
T. Wolf et al.: "Thermoresponsive coacervate formation of random poly (phosphonate) terpolymers", European Polymer Journal, vol. 95, pp. 756-765 (2017).
L. K. Müller et al.: „Multifunctional poly(phosphoester)s with two orthogonal protective groups, RSC Advances, vol. 5, pp. 42881-42888 (2015).
S. Vanslambrouck et al.: "Synthesis and tensioactive properties of PEO-b-polyphosphate copolymers", RSC Advances, vol. 5, pp. 27330-27337 (2015).
F. Agel: "Axial chirale Phoshite als Liganden in der enantioselektiven Rhodium-katalysierten Hydrierung", Dissertation Technische Hochschule Aachen, pp. 1-127, http://publications.rwth-aachen.de/record/59926/files/59926 (2005), English Abstract.
P. Murmann et al.: „Influence of the Fluorination Degree of Organophosphates on Flammability and Electrochemical Performance in Lithium Ion Batteries, Journal of the Electrochemical Society, vol. 165 (9), pp. A1935-A1942 (2018).
V. Sharova et al.: "Comparative study of imide-based Li salts as electrolyte additives for Li-ion batteries", Journal of Power Sources, vol. 375, pp. 43-52 (2018).
J. Li et al.: "The Impact of Electrolyte Additives and Upper Cut-off Voltage on the Formation of a Rocksalt Surface Layer in $LiNi_{0.8}Mn_{0.1}Co_{0.1}O_2$ Electrodes" Journal of the Electrochemical Society, vol. 164 (4), pp. A655-A665 (2017).
J. Li et al.: "Effect of Choices of Positive Electrode Material, Electrolyte, Upper Cut-Off Voltage and Testing Temperature on the Life Time of Lithium-Ion Cells", Journal of the Electrochemical Society, vol. 165 (13), pp. A3195-A3204 (2018).
T. Wolf et al.: "Reversible Self-Assembly of Degradable Polymersomes with Upper Critical Solution Temperature in Water", Journal of the American Chemical Society, vol. 139, pp. 11064-11072 (2017).
X. Chen et al.: "Multilayer choline phosphate molecule modified surface with enhanced cell adhesion but resistant to protein adsorption", Langmuir, American Chemical Society, pp. 1-23 (2017).
T. Wolf et al.: "Cyclohexyl-substituted poly(phosphonate)-copolymers with adjustable glass transition temperatures", Polymer Chemistry, vol. 7, pp. 2934-2937 (2016).
S. Schöttler et al.: "Protein adsorption is required for stealth effect of poly(ethylene glycol)- and poly(phosphoester)-coated nanocarriers", Nature Nanotechnology, vol. 11, pp. 372-377 (2016).
J. Maca et al.: "The Phosphate Flame Retardant Influence on Electrolytes Physical Properties", The Electrochemical Society, vol. 63 (1), pp. 81-84 (2014).

\* cited by examiner

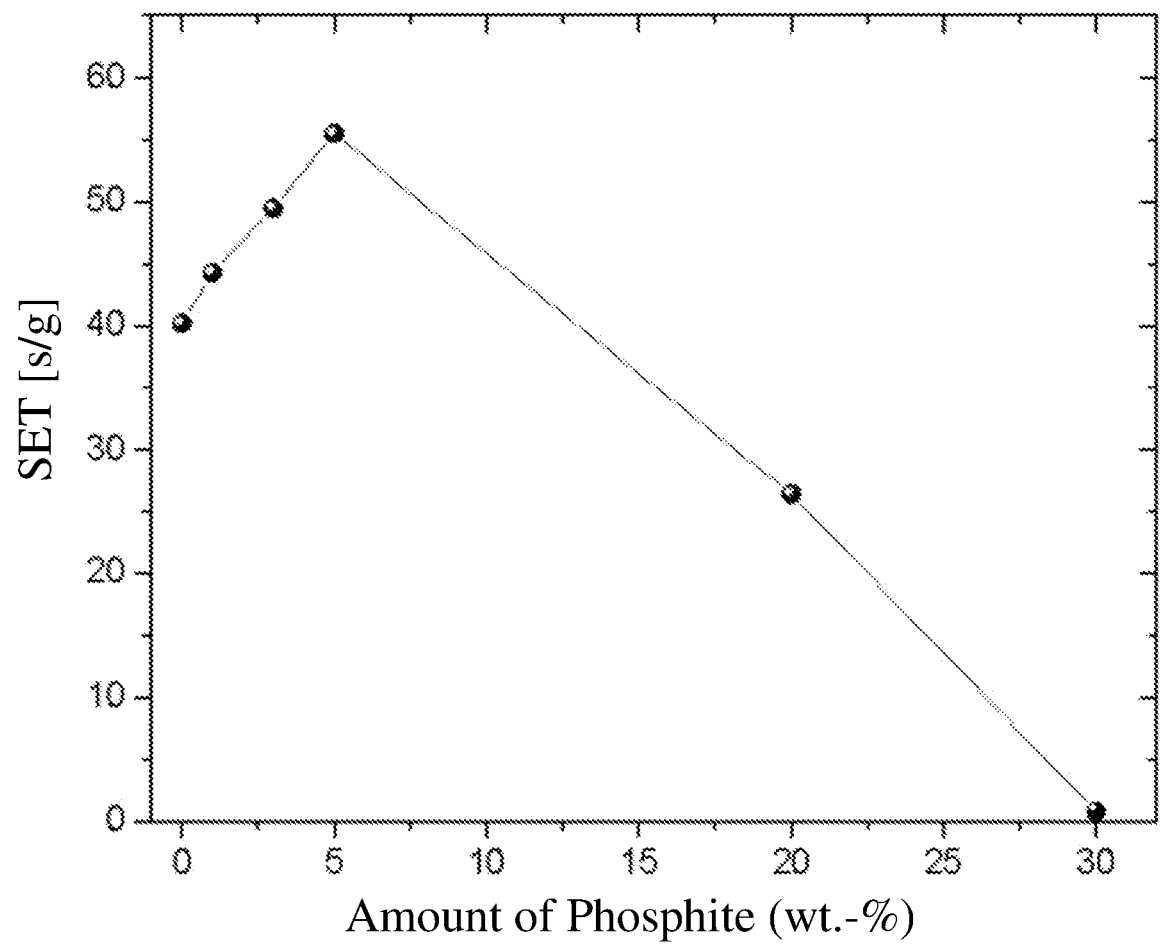

ELECTROLYTE COMPRISING A PHOSPHITE AS AN ADDITIVE OR CO-SOLVENT, LITHIUM RECHARGEABLE BATTERY COMPRISING SAID ELECTROLYTE, AND METHOD FOR PRODUCING THE PHOSPHITE

CROSS REFERENCE TO PRIOR APPLICATIONS

This application is a U.S. National Phase application under 35 U.S.C. § 371 of International Application No. PCT/DE2019/200071, filed on Jul. 5, 2019 and which claims benefit to German Patent Application No. 10 2018 116 475.0, filed on Jul. 6, 2018. The International Application was published in German on Jan. 9, 2020 as WO 2020/007425 A1 under PCT Article 21(2).

FIELD

The present invention relates to an electrolyte comprising a phosphite as an additive or as a co-solvent, a rechargeable lithium battery comprising the electrolyte, and a method for producing the phosphite.

BACKGROUND

The importance of batteries as a source of energy and a storage medium has increased significantly in recent years to realize the efficient use of renewable energies and for use in electro-mobility. To be able to achieve these desired objectives, the batteries must be continuously improved.

In all types of existing and future lithium, lithium-ion, and dual-ion batteries, electrolytes have a key role to play with respect to performance, service life and safety, because they interact with all the other active and inactive materials which are used. The liquid electrolyte has a significant impact on a great many chemical and technological aspects of a battery. These range from the conductivity, due to the solubility of the conducting salts, the electrochemical stability, the usability, the flammability, and the vapor pressure through to the film-forming properties of the electrolyte, which has significant effects on the so-called "Solid Electrolyte Interface" (SEI) as it forms at the anode, and the "Cathode Electrolyte Interface" (CEI) as it forms at the cathode.

The liquid electrolyte, as the key component of every battery cell, comprises a conducting salt, for example $LiPF_6$, and a mixture of selected linear and cyclic carbonates, which is generally termed the standard electrolyte.

A great weakness of these electrolytes is their low oxidative stability and high flammability (Xu K. *Chem. Rev.* 2004, 104 (10), 4.303-4.418).

Oxidative stability is a major problem especially when the development of new cathode materials (5 V cathodes) leads to higher end-of-charge voltages being used, thus increasing the energy density (Xu, K., *Chem. Rev.* 2014, 114 (23), 11503-11618).

When an end-of-charge voltage greater than 4.3 V is used against a lithium reference ($Li/Li^+$), oxidative decomposition of the carbonate-based electrolyte takes place at the cathode, resulting in a greater reduction in capacity and thus a reduction in the service life of the battery.

One approach to preventing the decomposition of the electrolyte at the cathode and the resulting decrease in capacity is to use additives in electrolytes (usually in quantities of between 0.1 and 5 wt.-%). The advantage of this approach is that the main structure of the electrolyte is retained. The role of the additive is to form a protective layer (CEI) on the cathode and thus prevent or reduce the electrolyte decomposition of the standard electrolyte (Xu, K., *Chem. Rev.* 2014, 114 (23), 11503-11618).

A great many different additives for this purpose have previously been described. These include partially fluorinated organic compounds which contain no heteroatoms apart from fluorine (Zheng, X.; Huang, T.; Pan, Y.; Wang, W.; Fang, G.; Ding, K.; Wu, M., *ACS Applied Materials & Interfaces* 2017, 9 (22), 18758-18765; Kim, S.; Kim, M.; Choi, I.; Kim, J. J., *J. Power Sources* 2016, 336 (Supplement C), 316-324), and partially fluorinated organic compounds which additionally contain the following heteroatoms: nitrogen (see, for example, Wang, L.; Ma, Y.; Li, Q.; Zhou, Z.; Cheng, X.; Zuo, P.; Du, C.; Gao, Y.; Yin, G., *J. Power Sources* 2017, 361 (Supplement C), 227-236), phosphorus (see, for example, von Aspern, N.; Röser, S.; Rezaei Rad, B.; Murmann, P.; Streipert, B.; Mönnighoff, X.; Tillmann, S. D.; Shevchuk, M.; Stubbmann-Kazakova, O.; Röschenthaler, G.-V.; Nowak, S.; Winter, M.; Cekic-Laskovic, I., *J. Fluor. Chem.* 2017, 198 (Supplement C), 24-33; Tornheim, A.; He, M.; Su, C.-C.; Zhang, Z., *J. Electrochem. Soc.* 2017, 164 (1), A6366-A6372; Wagner, R.; Korth, M.; Streipert, B.; Kasnatscheew, J.; Gallus, D. R.; Brox, S.; Amereller, M.; Cekic-Laskovic, I.; Winter, M., *ACS Applied Materials & Interfaces* 2016, 8 (45), 30871-30878), sulfur (see, for example, Rong, H.; Xu, M.; Zhu, Y.; Xie, B.; Lin, H.; Liao, Y.; Xing, L.; Li, W., *J. Power Sources* 2016, 332 (Supplement C), 312-321), boron (see, for example, Wang, K.; Xing, L.; Zhu, Y.; Zheng, X.; Cai, D.; Li, W., *J. Power Sources* 2017, 342 (Supplement C), 677-684), and silicon (see, for example, Wang, K.; Xing, L.; Zhu, Y.; Zheng, X.; Cai, D.; Li, W., *J. Power Sources* 2017, 342 (Supplement C), 677-684; Imholt, L.; Röser, S.; Börner, M.; Streipert, B.; Rad, B. R.; Winter, M.; Cekic-Laskovic, I., *Electrochim. Acta* 2017, 235 (Supplement C), 332-339).

Organometallic (Imholt, L.; Röser, S.; Börner, M.; Streipert, B.; Rad, B. R.; Winter, M.; Cekic-Laskovic, I., *Electrochim. Acta* 2017, 235 (Supplement C), 332-339) and lithium salt-based (see, for example, Dong, Y.; Young, B. T.; Zhang, Y.; Yoon, T.; Heskett, D. R.; Hu, Y.; Lucht, B. L., *ACS Applied Materials & Interfaces* 2017, 9 (24), 20467-20475) electrolyte additives were also proposed.

By adding these additives to standard electrolytes, the decrease in capacity can be reduced, but not completely prevented. All these additives decompose before the standard electrolyte during the oxidation at the cathode and form an effective CEI. This CEI can prevent the further decomposition of the electrolyte, reduce the internal resistance, improve the structural stability of the cathode, prevent the generation of gases and the metal dissolution of the metals contained in the cathode, and minimize the ion mixing of $Li^+$ and $Ni^{2+}$ ions in the cathode which occurs because the radii of the ions are similar.

Safety aspects, in particular the flammability of a carbonate-based electrolyte, is also important in addition to the oxidative decomposition at high end-of-charge voltages. The linear and cyclic carbonates which are normally used are highly flammable; there have been repeated reports about battery fires, such as those for the Samsung Galaxy Note 7 in 2016. It is therefore important to develop batteries which are safer with respect to their flammability.

In addition to developing new solvents for electrolytes, another possibility is to add flame retardants as additives (<5 wt.-%) or co-solvents (>5 wt.-%) to the standard electrolyte (Xu, K., *Chem. Rev.* 2004, 104 (10), 4303-4418; Xu, K., Chem. Rev. 2014, 114 (23), 11503-11618). This approach also does not change the main structure of the electrolyte.

Compounds which contain phosphorus atoms with oxidation states of III or V have proven to be effective flame retardants. Compounds which contain phosphorus atoms with an oxidation state of V can be subdivided into two subgroups: there are the phosphates/phosphites, and the phosphazenes, which contain several nitrogen atoms in addition to several phosphorus atoms.

It has been shown that a high proportion (>20 wt.-%) of flame retardant is needed when phosphites (oxidation state III) and phosphates (oxidation state V) are used to produce a non-flammable electrolyte (see, for example, von Aspern, N.; Röser, S.; Rezaei Rad, B.; Murmann, P.; Streipert, B.; Mönnighoff, X.; Tillmann, S. D.; Shevchuk, M.; Stubbmann-Kazakova, O.; Röschenthaler, G.-V.; Nowak, S.; Winter, M.; Cekic-Laskovic, I., J. Fluor. Chem. 2017, 198 (Supplement C), 24-33; Murmann, P.; Mönnighoff, X.; von Aspern, N.; Janssen, P.; Kalinovich, N.; Shevchuk, M.; Kazakova, O.; Röschenthaler, G.-H.; Cekic-Laskovic, I.; Winter, M., J. Electrochem. Soc. 2016, 163 (5), A751-A757). The high proportion of flame retardant has a negative effect, however, on the cycling (performance and service life) of the battery compared to the standard electrolyte. This is primarily due to the fact that the flame retardant used is incompatible with the graphite anode.

Replacing the hydrogen atoms with fluorine atoms has proven to be an effective way of improving the incompatibility of these flame retardants with the graphite anode. This approach made it possible to significantly improve the cycling, and thus the service life, of the battery compared to the non-fluorinated co-solvent. It was not, however, possible to achieve the performance and service life of the standard electrolytes (Murmann, P.; Mönnighoff, X.; von Aspern, N.; Janssen, P.; Kalinovich, N.; Shevchuk, M.; Kazakova, O.; Röschenthaler, G.-H.; Cekic-Laskovic, I.; Winter, M., J. Electrochem. Soc. 2016, 163 (5), A751-A757; Mönnighoff, X.; Murmann, P.; Weber, W.; Winter, M.; Nowak, S., Electrochim. Acta 2017, 246 (Supplement C), 1042-1051).

A further advantage of introducing fluorine atoms is that they also have an impact on the flammability, i.e., fluorinated compounds are inherently better than non-fluorinated compounds at reducing the flammability of the electrolyte. The chemistry of the flammability of fluorinated compounds is, however, complex and not yet fully understood; the degree of fluorination therefore does not allow any conclusions to be drawn about the flammability of individual compounds (Murmann, N. von Aspern, P. Janssen, N. Kalinovich, M. Shevchuk, G.-V. Röschenthaler, M. Winter, I. Cekic-Laskovic, J. Electrochem. Soc. 2018, 165, A1935-A1942; P. Murmann, X. Mönninghoff, N. von Aspern, P. Janssen, N. Kalinovich, M. Shevchuk, O. Kazakova, G.-V. Röschenthaler, I. Cekic-Laskovic, M. Winter, J. Electrochem. Soc. 2016, 163 (5), A751-A757).

Using phosphazenes as the flame retardant makes it possible to drastically reduce the proportion (5 wt.-%) to obtain a non-flammable liquid electrolyte whereby no negative effect on the cycling performance is evident. These additives can also be used for high-voltage applications because they form an effective CEI (Ji, Y.; Zhang, P.; Lin, M.; Zhao, W.; Zhang, Z.; Zhao, Y.; Yang, Y., J. Power Sources 2017, 359 (Supplement C), 391-399; Xia, L.; Xia, Y.; Liu, Z., J. Power Sources 2015, 278 (Supplement C), 190-196).

This bifunctional use is not known for phosphites and phosphates. It has been possible to show, however, that different applications can be realized by varying the proportion of the phosphites/phosphates in the standard electrolyte. When the proportion is low (1 wt.-%), the phosphites/phosphates can be used as high-voltage additives; when the proportion is high (>20 wt.-%), they serve as a flame retardant (von Aspern, N.; Röser, S.; Rezaei Rad, B.; Murmann, P.; Streipert, B.; Monnighoff, X.; Tillmann, S. D.; Shevchuk, M.; Stubbmann-Kazakova, O.; Röschenthaler, G.-V.; Nowak, S.; Winter, M.; Cekic-Laskovic, I., J. Fluor. Chem. 2017, 198 (Supplement C), 24-33). No electrochemical measurements for the high phosphite/phosphate content were undertaken in this work, however, so that it is not possible to say anything about the performance and service life of the batteries.

When the standard electrolyte was investigated in respect of electro-chemical aging, different phospholanes with an oxidation state of V were observed as decomposition products (Takeda, S.; Morimura, W.; Liu, Y.-H.; Sakai, T.; Saito, Y., Rapid Commun. Mass Spectrom. 2016, 30 (15), 1754-1762; Weber, W.; Kraft, V.; Grützke, M.; Wagner, R.; Winter, M.; Nowak, S., J. Chromatogr. A 2015, 1394 (Supplement C), 128-136). To investigate the effect of these decomposition products on the standard electrolyte, phospholanes were studied as a solvent, a co-solvent, and an additive, and demonstrated a positive effect on the general electro-chemical performance of the battery. In respect of the use as a solvent together with ethylene carbonate (EC), phospholanes with oxidation states of III and V were investigated, where the terminal group of the alkyl group can have 0 to 3 fluorine atoms. It was postulated that, in Li/LMO cells with an end-of-charge voltage of 4.2 V against Li/Li$^+$, this system behaves in a similar manner to the cyclic phosphates, and that it is a flame-retardant solvent (Narang, S. C.; Ventura, S. C.; Zhao, M.; Smedley, S.; Koolpe, G.; Dougherty, B. WO97/44842).

When a co-solvent such as ethylene ethyl phosphate (EEP) is used, which does not contain any fluorine atoms, the flammability of the electrolyte can be reduced by approximately 50% by adding 10 wt.-%. By forming a protective film on the anode and cathode, the cycling at an end-of-charge voltage of 4.3 V against Li/Li$^+$ can furthermore be improved compared to the standard electrolyte (Gao, D.; Xu, J. B.; Lin, M.; Xu, Q.; Ma, C. F.; Xiang, H. F., RSC Adv. 2015, 5 (23), 17566-17571).

Other phospholanes with an oxidation state of III were also investigated as a co-solvent and as an additive. The length and the degree of fluorination of the alkyl group were varied and the ring substituted with one or two alkyl chains, the length and the degree of fluorination also being varied. It was possible to demonstrate an approximately 30% reduction in flammability compared to the standard electrolyte when adding 30 wt.-% of the phospholane. During the galvanostatic cycling of a half-cell at 0.001 V to 1.5 V, the cells which contained a phospholane as a co-solvent demonstrated a good charging and discharging profile. The capacities achieved are still, however, far below that of the standard electrolyte. When used as an additive, it was possible to achieve capacities which were better than those of the standard electrolyte (U.S. Pat. No. 8,062,796 B2). An experiment on full-cells was not performed.

It has previously been described that measurement results from half-cells cannot, however, simply be transferred to full cells (V. Sharova, A. Moretti, T. Diemant, A. Varzi, R. J. Behm, S. Passerini, J. Power Sources (2018), 375, 43-52). It is furthermore previously been described that cells exhibit very different behavior when a cut-off voltage of up to 4.2 V rather than a cut-off voltage above 4.2 V is used (high-voltage applications) (J. Li, H. Liu, J. Xia, A. R. Cameron, M. Nie, G. A. Botton. J. R. Dahn, J. Electrochem. Soc. (2017), 164, A655-A665; J. Li, S. L. Glazier, K. Nelson, X. Ma, J. Harlow, J. Paulsen, J. R. Dahn, J. Electrochem. Soc. (2018), 165, A3195-A3204).

It was also possible to show that the problem of phosphate reduction on the anode can be prevented by the formation of a protective layer on the anode, induced by EEP, when EEP (5 wt.-%) is added as an additive to an electrolyte reference system comprising ethylene carbonate:diethyl carbonate:trimethyl phosphate (6:2:2), and thus the cycling at an end-of-charge voltage of 1.5 V against Li/Li$^+$ can be improved (Ota, H.; Kominato, A.; Chun, W.-J.; Yasukawa, E.; Kasuya, S., *J. Power Sources* 2003, 119 (Supplement C), 393-398).

EEP (when 1 wt.-% is added) can also be used for high-voltage applications. The cell was here cycled for ten charge/discharge cycles up to 4.4 V against Li/Li$^+$ at 20° C., the cell was then stored for 2 hrs. at 45° C., to subsequently be charged to 4.6 V against Li/Li$^+$ and then maintained for 60 hrs. It was thus possible to show that EEP forms a CEI and has a lower internal resistance than the standard electrolyte (Tornheim, A.; He, M.; Su, C.-C.; Zhang, Z., *J. Electrochem. Soc.* 2017, 164 (1), A6366-A6372). These tests cannot, however, show what effect frequent charging and discharging with high end-of-charge voltages has on the performance of the battery.

SUMMARY

An aspect of the present invention is to further improve previously described electrolytes for rechargeable lithium batteries, in particular to also reduce the flammability and/or improve the performance of the batteries for high-voltage applications.

In an embodiment, the present invention provides an electrolyte which comprises at least one lithium salt, at least one first organic solvent having a dielectric constant of >90 at 40° C., at least one second organic solvent having a boiling point of <110° C., and at least one phosphite having the formula (I)

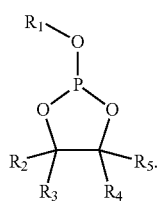

(I)

$R_1$ is selected from an n-propoxy group, an iso-propoxy group, a tert-butoxy group, an n-pentafluoropropoxy group, an n-trifluoropropoxy group, an iso-hexafluoropropoxy group, or a tert-nonafluorobutoxy group. $R_2$, $R_3$, $R_4$, and $R_5$ are each selected, independently of one another, from H, a trifluoromethyl group, or a $C_2$-$C_6$-alkyl group which is substituted with a trifluoromethyl group.

BRIEF DESCRIPTION OF THE DRAWING

The present invention is described in greater detail below on the basis of embodiments and of the drawing in which:

The FIGURE shows a diagram with the results of an SET (Self-Extinguishing Time) test of an electrolyte with 1M LiPF$_6$ in ethylene carbonate and ethyl methyl carbonate (1:1). In this case, 500 µl of the electrolyte under investigation were applied to a GF/C glass fiber filter (Whatman separator) (Ø 25 mm). This was placed in the measuring device and the "Self-Extinguishing Time" then determined with the aid of a UV-Vis detector.

DETAILED DESCRIPTION

The present invention provides an electrolyte, comprising:
at least one lithium salt;
at least one first and one second organic solvent, the first organic solvent having a dielectric constant of more than 90 (at 40° C.), and the second organic solvent having a boiling point of less than 110° C.; and
at least one phosphite with the formula (I)

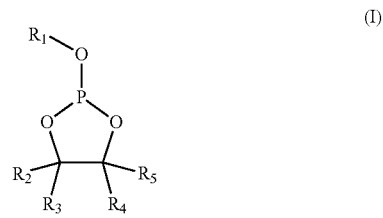

(I)

where $R_1$ is an n-propoxy group, an iso-propoxy group, a tert-butoxy group, an n-pentafluoropropoxy group, an n-trifluoropropoxy group, an iso-hexafluoropropoxy group, or a tert-nonafluorobutoxy group, and $R_2$, $R_3$, $R_4$ and $R_5$ are selected independently of one another from H, a trifluoromethyl group, or a $C_2$-$C_6$ alkyl group which is substituted with a trifluoromethyl group.

An n-propoxy group is understood to be the group $H_3C$—$CH_2$—$CH_2$—$O$—, an iso-propoxy group as the group $[CH_3]_2$—$CH$—$O$—, a tert-butoxy group as the group $[CH_3]_3$—$C$—$O$—, an n-pentafluoropropoxy group as the group $F_3C$—$CF_2$—$CH_2$—$O$—, an n-trifluoropropoxy group as the group $F_3C$—$CH_2$—$CH_2$—$O$—, an iso-hexafluoropropoxy group as the group $[CF_3]_2$—$CH$—$O$—, and a tert-nonafluorobutoxy group as the group $[CF_3]_3$—$C$—$O$—.

The flammability of the electrolytes according to the present invention is significantly reduced.

To achieve the reduction in flammability, a smaller quantity of phosphite additive is required in this case compared to the previously described compounds. It is thus possible to achieve non-flammability with an additive proportion of 15 wt.-%, whereas in the prior art, an additive proportion of at least 30 wt.-% is necessary for a comparable effect (U.S. Pat. No. 8,062,796 B2).

The reduction in flammability can in particular be achieved by substituting the phosphite ring with trifluoromethylethylene groups, as is realized in the compound PFPOEPi-1CF$_3$.

The following abbreviations are hereinafter used:

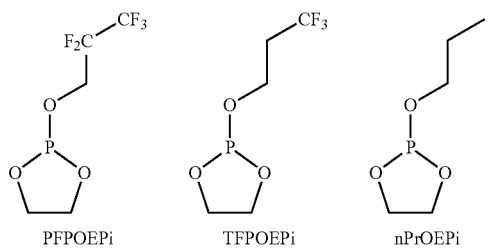

PFPOEPi          TFPOEPi          nPrOEPi

-continued

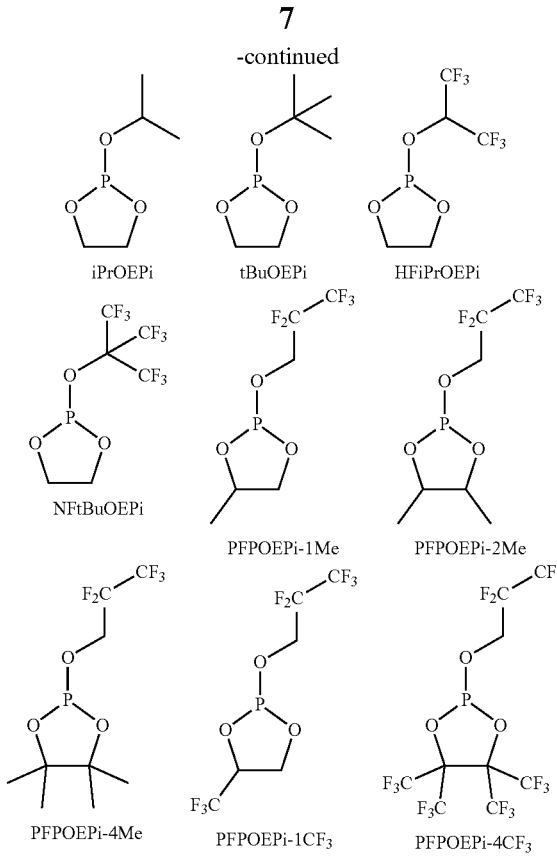

A substance is said to be flammable when it has a burning time of >20 s/g. If it has a burning time of between 6 and 20 s/g, it is termed flame retardant, and a burning time of <6 s/g is non-flammable.

A "normal range" is understood to mean a cut-off voltage of up to 4.2 V, and a "high-voltage range" means voltages above 4.2 V, especially a voltage of 4.5 V.

An "improved cycling behavior", "advantageous cycling behavior", or a "positive cycling behavior" is understood to mean that the capacity of a cell is held at a higher level by comparison for the same number of charging and discharging cycles.

The electrolytes according to the present invention furthermore exhibit improved cyclability. This applies in particular when additives are used in which $R_1$ is an aliphatic unsubstituted group, and when the cycling is above 4.2 V. The use of phosphites with the structures shown or dioxaphospholanes in the high-voltage range (above 4.2 V) has not previously been described.

It has also been found that surprisingly advantageous cycling results can be achieved with the aid of non-fluorinated phosphites. The prior art has to date attempted to improve the cycling with the aid of fluorination.

Since the measurements are conducted in full cells, it can thus be shown that the compounds according to the present invention can contribute to a positive cycling behavior on the cathode as well as on the anode.

$R_1$ can, for example, be an n-propoxy group, an isopropoxy group, or a tert-butoxy group.

In an embodiment, $R_1$ can, for example, be a tert-butoxy group.

$R_1$ can, for example, be an n-pentafluoropropoxy group.

In am embodiment, $R_2$ can, for example, be a trifluoromethyl group and $R_3$, $R_4$, and $R_5$ are H.

In an embodiment, $R_2$, $R_3$, $R_4$, and $R_5$ can, for example, be H.

In an embodiment, the at least one phosphite can, for example, be present in a proportion of 0.1 to 15 wt. %, relative to the total weight of the organic solvent.

The present invention furthermore relates to the use of an electrolyte in a rechargeable lithium battery at a voltage above 4.2 V, wherein the electrolyte comprises the following:
at least one lithium salt;
at least one first and one second organic solvent, the first organic solvent having a dielectric constant of more than 90 (at 40° C.), and the second organic solvent having a boiling point of less than 110° C.; and
at least one phosphite with the formula (I)

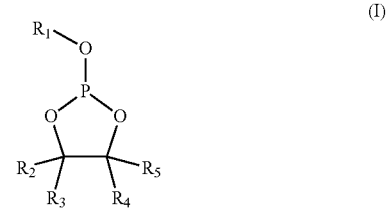

(I)

where $R_1$ is a completely or partially halogen-substituted, linear or branched, $C_2$-$C_{20}$ alkyl group, and $R_2$, $R_3$, $R_4$, and $R_5$ are selected independently of each other from H, or an unsubstituted or completely or partially halogen-substituted, linear or branched, $C_1$-$C_{20}$ alkyl group.

The present invention also relates to a rechargeable lithium battery, comprising:
a cathode;
an anode;
a separator; and
the electrolyte according to the present invention.

The proportion of the phosphite in the electrolyte can, for example, be 0.1 to 15 wt.-%, relative to the total weight of the organic solvent.

The at least one phosphite can, for example, be present in a proportion of 1 to 30 wt.-%, relative to the total weight of the organic solvent.

The lithium salt can, for example, be selected from the group comprising lithium perchlorate (LiClO$_4$), lithium hexafluorophosphate (LiPF$_6$), lithium borofluoride (LiBF$_4$), lithium hexafluoroarsenide (LiAsF$_6$), lithium trifluorometasulfonate (LiCF$_3$SO$_3$), lithium bistrifluoromethyl sulfonylimide (LiN(CF$_3$SO$_2$)$_2$), lithium bis(oxalato)borate (LiB[C$_2$O$_4$]$_2$), lithium oxalyldifluoroborate (LiBF$_2$C$_2$O$_4$), lithium nitrate (LiNO$_3$), lithium triperfluoroethylperfluorophosphate (LiPF$_3$(CF$_2$CF$_3$)$_3$), lithium bisperfluoroethylsulfonylimide (C$_4$F$_{10}$LiNO$_4$S$_2$), lithium bis(trifluoromethanesulfonyl)imide (CF$_3$SO$_2$NLiSO$_2$CF$_3$), lithium bis(fluorosulfonyl)imide (F$_2$NO$_4$S$_2$Li), lithium trifluoromethanesulfonimide (C$_2$F$_6$LiNO$_4$S$_2$), and combinations thereof.

In an embodiment of the present invention, the first organic solvent can, for example, be selected from the group comprising ethylene carbonate, polypropylene carbonate, butylene carbonate, 2,3-butylene carbonate, isobutylene carbonate, polypropylene carbonate, γ-butyrolactone, and combinations thereof.

In an embodiment of the present invention, the second organic solvent can, for example, be selected from a group comprising dimethyl carbonate, ethyl methyl carbonate, diethyl carbonate, dipropyl carbonate, dimethoxyethane, diethoxyethane, aliphatic ester derivatives, and combinations thereof.

The first organic solvent and the second organic solvent can, for example, be in a ratio of 5:1 to 1:5, for example, 2:1 to 1:2, for example, 1:1.

The present invention also relates to a rechargeable lithium battery, comprising:
a cathode;
an anode;
a separator; and
the electrolyte according to the present invention.

In the context of the present invention, the term "rechargeable battery" is taken to mean any rechargeable electric storage device.

The active substance of the cathode can, for example, consist of a material which is selected from lithium-manganese-nickel-oxides, lithium-nickel-manganese-cobalt mixed-oxides of the type $LiMO_2$ where M=Mn, Co, Ni, or of the type $LiMPO_4$ where M=Ni, Mn, Co, and lithium-rich transition metal oxides of the type $xLiMnO_3\text{-}(1\text{-}x)LiMO_2$ where M=Ni, Mn, Co, and $0<x<1$.

In an embodiment of the present invention, the rechargeable lithium battery can, for example, consist of a material which is selected from the group comprising lithium metal, graphite, silicon, and alkali or alkaline earth metals.

In an embodiment of the present invention, the proportion of the phosphite in the organic electrolyte can, for example, be 1 to 5 wt.-%, relative to the total weight of the organic solvent. The phosphite according to the present invention is in this case thus used as an additive.

In an embodiment of the present invention, the proportion of the phosphite in the organic electrolyte can, for example, be 10 to 30 wt.-%, relative to the total weight of the organic solvent. The phosphite according to the present invention in this case thus serves as a co-solvent.

The present invention furthermore relates to a method to produce a phosphite with the formula (I) whereby, in a one-pot reaction, in a first step, a phosphorus (III) halide, for example, phosphorus (III) chloride, reacts with a vicinal diol in the presence of a base, for example, triethylamine, to produce a 2-halogen-1,3-dioxaphospholane, and this is followed by a second step, esterification with an alcohol in the presence of a base, for example, triethylamine, to produce a phosphite with the formula (I).

It was possible to show that the proposed phosphites, successfully produced for the first time in a one-pot synthesis, have a variety of possible uses as additives or co-solvents for the electrolytes of rechargeable lithium batteries. The use is determined by correctly selecting the proportion of the phosphite in the electrolyte.

When used as an additive (<5 wt.-%) with an end-of-charge voltage>4.4 V against $Li/Li^+$, an effective CEI is formed on the cathode, and the cycling can be significantly improved. The durability of the batteries can thus be improved by at least 100 cycles compared to the standard electrolyte since the capacity decrease is reduced.

The method of synthesis according to the present invention for the phosphites used in the electrolyte according to the present invention starts with a phosphorus (III) halide (for example, $PCl_3$) and a vicinal diol in the presence of a base such as pyridine or triethylamine in, for example, THF as the solvent. The resulting 2-halogenated 1,3-dioxaphospholane is esterified with an alcohol in the presence of a base, for example, triethylamine in THF, in a second step of the one-pot synthesis.

The battery can furthermore be improved by selecting a high proportion (10 to 15 wt.-%) of the phosphite. The flammability of the electrolyte can here be completely suppressed. The addition of the phosphite can moreover significantly improve the cycling at an end-of-charge voltage of 4.2 V against $Li/Li^+$ compared to the standard electrolyte. This results in a safer battery with a longer service life.

In an embodiment, the phosphite (I) can, for example, be substituted with a trimethylsilyl group. The cycling can be improved by adding a trimethylsilyl substituted compound. Without wanting to be restricted by a theory, it is assumed that the trimethylsilyl group captures the hydrogen fluoride formed as an intermediate product and thus prevents damage to the battery which would otherwise occur.

The present invention furthermore relates to the use of $PFPOEPi\text{-}1CF_3$ in an electrolyte at 0.1 V up to 4.2 V.

The present invention also relates to the use of an electrolyte in a rechargeable lithium battery at a voltage of 4.2 V or less than 4.2 V, wherein the electrolyte comprises the following:
at least one lithium salt;
at least one first and one second organic solvent, the first organic solvent having a dielectric constant of more than 90 (at 40° C.), and the second organic solvent having a boiling point of less than 110° C.; and
at least one phosphite with the formula (I)

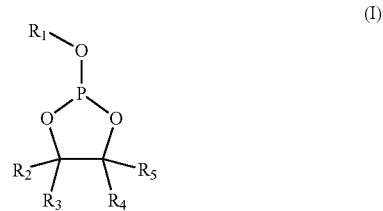

where $R_1$ is an n-pentafluoropropoxy group, $R_2$ a trifluoromethyl group, and $R_3$, $R_4$, and $R_5$ are H.

Adding the compound (I) to the electrolyte can give rise to an advantageous cycling behavior.

Further advantages are illustrated by the below examples.

EXAMPLES

Manufacturing Example

Production of 2-(2,2,3,3,3-pentafluoropropoxy)-4 (trifluoromethyl)-1,3,2-dioxaphospholane (Reaction Scheme 1)

Reaction scheme 1

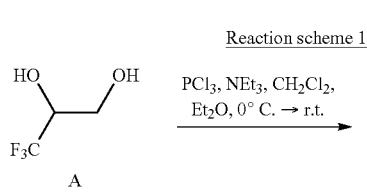

A

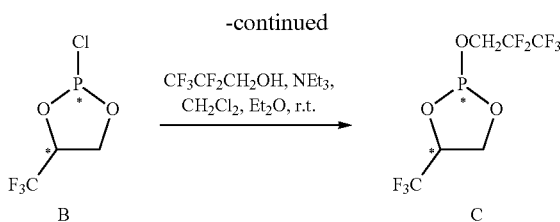

All reaction steps take place in an argon atmosphere in dry solvents.

15.0 g (0.12 mol, 1 eq.) 3,3,3-trifluoropropane-1,2-diol (X. J. Wang et al./Electrochemistry Communications 12 (2010) 386-389) reacts with NEt$_3$ (23.3 g, 0.24 mol, 2 eq.) and is slowly added dropwise to a solution of PCl$_3$ (16.4 g, 0.12 mol, 1 eq.) in CH$_2$Cl$_2$/Et$_2$O (10:1) (250 mL) at 0° C. The ice bath was removed and the reaction mixture brought to room temperature. The progress of the reaction was monitored by $^{31}$P-NMR. The reaction was complete after 48 hrs., the signal of 2-chloro-4-(trifluoromethyl)-1,3,2-dioxaphospholane being observed at 172.78 ppm (approximately 70%). The product was filtered with a reverse frit (Schlenk frit) under argon, the residue rewashed with ether, and the filtrate subjected to further reaction without purification. 18.0 g (0.12 mol, 1 eq.) 2,2,3,3,3-pentafluoropropanol with NEt$_3$ (12.12 g, 0.12 mol, 1 eq.) was added dropwise to the filtrate (room temperature, Ar). The progress of the reaction was monitored by $^{31}$P-NMR. The reaction was complete after 24 hrs. Two diastereomers of 2-(2,2,3,3,3-pentafluoropropoxy)-4-(trifluoromethyl)-1,3,2-dioxaphospholane and approximately 30% by-products were observed. The reaction solution was filtered with a reverse frit under argon, the residue rewashed with ether, the solvent removed, and the residue distilled (52 mbar).

The diastereomer mixture of 2-(2,2,3,3,3-pentafluoropropoxy)-4-(trifluoromethyl)-1,3,2-dioxaphospholane (reaction scheme 2) is a colorless, viscous liquid, boiling point 44° C. (52 mbar). Yield: 5.3 g, 0.016 mol=14%

Reaction scheme 2

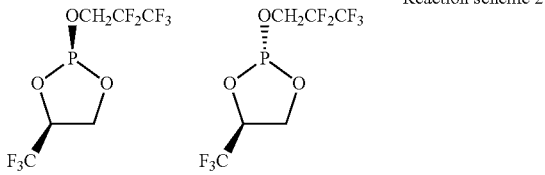

$^1$H-NMR (400 MHz, CDCl$_3$): δ 4.79-4.69 (m, 1H), 4.54-4.45 (m, 1H), 4.41-4.34 (m, 1H), 4.33-4.15 (m, 5H).

$^{31}$P-NMR (162 MHz, CDCl$_3$): δ 145.43 (t, J=7.2 Hz), 144.06 (t, J=6.7 Hz).

$^{19}$F-NMR (376 MHz, CDCl$_3$): δ −76.22 (s), −79.31 (s), 83.33 (s), −83.43 (s), −83.50 (s), −124.28 (s), −124.42 (t, J=11.9 Hz), −126.03 (t, J=14.6 Hz).

EXAMPLE EMBODIMENTS

To investigate the behavior of the electrolyte according to the present invention for high-voltage applications, an electrolyte with 1M LiPF$_6$ in ethylene carbonate (EC) and ethyl methyl carbonate (EMC) (1:1) was tested in one case without the addition of phosphite, in the other case with the addition of the quantity of phosphite stated (wt.-%) in graphite/NCM111 cells at the voltage vs. Li/Li$^+$ stated in each case. A microporous, ceramic-coated film (available from Evonik Industries AG under the brand name Separion®) was used as the separator. The cells were formed with a C-rate of 0.1 C and a subsequent C-rate of 0.5 C for 3 cycles each at the voltage described hereinafter. The C-rate describes the charging (or discharging) current of a battery relative to the capacity C. A constant voltage step of 3 h is integrated in the formation cycles in each case. The cells were subsequently cycled with a C-rate of 1 C. The results of measurements at 4.5 V are given in Table 1.

In the following tables, the header line "Electrolyte additive" states the percentage of a phosphite as the wt.-% which has been added as an additive to the electrolyte used, "80% SOH" gives the 80% capacity retention of the 130th cycle as a percentage (the cycle achieved is shown in parentheses in each case), "Efficiency [%]" states the first cycle efficiency as a percentage, and "Retention [%]" the capacity retention as a percentage after 100 cycles.

TABLE 1

| Electrolyte Additive | Efficiency [%] | Retention [%] | 80% SOH |
|---|---|---|---|
| 0% | 82.2 | 83.9 | 68.6 (208th cycle) |
| 0.5% PFPOEPi | 82.4 | 90.6 | 71.8 (299th cycle) |
| 0.5% TFPOEPi | 83.7 | 94.8 | 75.2 (535th cycle) |
| 0.5% nPrOEPi | 84.0 | 96.0 | 76.3 (761st cycle) |
| 0.5% iPrOEPi | 82.8 | 96.1 | 76.2 (812th cycle) |
| 0.5% HFiPrOEPi | 83.9 | 93.6 | 72.7 (368th cycle) |
| 0.5% tBuOEPi | 58.0 | 98.8 | 78.7 (1095th cycle) |
| 0.5% NFtBuOEPi | 79.1 | 87.6 | 68.2 (316th cycle) |
| 0.5% PFPOEPi-1Me | 84.0 | 93.9 | 74.4 (651st cycle) |
| 0.5% PFPOEPi-2Me | 83.8 | 94.6 | 74.7 (609th cycle) |
| 0.5% PFPOEPi-4Me | 77.5 | 90.3 | 71.4 (602nd cycle) |
| 0.5% PFPOEPi-1CF$_3$ | 82.3 | 88.3 | 68.4 (370th cycle) |
| 0.5% PFPOEPi-4CF$_3$ | 77.7 | 84.8 | 71.6 (348th cycle) |

Further measurements were conducted at 4.2 V, these are listed in Table 2.

TABLE 2

| Electrolyte Additive | Efficiency [%] | Retention [%] | 80% SOH |
|---|---|---|---|
| 0% | 80.5 | 95.2 | 75.4 (1171st cycle) |
| 15.0% PFPOEPi | 67.8 | 83.9 | 56.1 (161st cycle) |
| 15.0% PFPOEPi-1Me | 70.7 | 92.9 | 63.6 (364th cycle) |
| 15.0% PFPOEPi-2Me | 44.7 | 74.5 | 45.9 (248th cycle) |
| 15.0% PFPOEPi-1CF3 | 80.1 | 96.4 | 77.2 (1468th cycle) |

To test the effect of the phosphite on the flammability of the electrolyte, a SET (Self-Extinguishing Time) test was conducted on an electrolyte according to the present invention with 1M LiPF$_6$ in EC:EMC (1:1) (FIG. 1). The volume of electrolyte tested was 500 μl. UV-VIS was used for detection.

In Table 3, rows two to five give the times (in seconds) which were determined using the SET test. The measurements refer to a 1M mixture of LiPF$_6$ EC:EMC (1:1) with the percentage given in the table header (wt.-%) of the compound stated in the column on the left. The proportion of the phosphites given ranges from 0 wt.-% to 15 wt.-%. No measurements were conducted for fields marked with a "-".

TABLE 3

|  | 0% | 0.5% | 1.5% | 2.5% | 5.0% | 10.0% | 15.0% |
|---|---|---|---|---|---|---|---|
| PFPOEPi | 40.2 | 45.3 | 46.0 | 45.3 | 38.8 | 20.7 | 15.4 |
| PFPOEPi-1CF$_3$ | 40.2 | 44.3 | 49.5 | 55.5 | 60.3 | 26.4 | 0.8 |
| PFPOEPi-1Me | 40.2 | — | — | — | — | — | 22.6 |
| PFPOEPi-2Me | 40.2 | — | — | — | — | — | 17.3 |

A clear reduction in flammability is already evident for a phosphite proportion of 10 wt.-%. With a phosphite proportion of 15 wt.-%, the electrolyte could be classed as flame retardant to noncombustible, depending on the phosphite added.

The characteristics of the present invention, which are disclosed in the aforementioned description, in the claims, and in the illustration, can be essential for the realization of the present invention in its various embodiments individually as well as in any combination.

The present invention is not limited to embodiments described herein; reference should be had to the appended claims.

What is claimed is:

1. An electrolyte comprising:
   at least one lithium salt;
   at least one first organic solvent having a dielectric constant of >90 at 40° C.;
   at least one second organic solvent having a boiling point of <110° C.; and
   at least one phosphite having the formula (I)

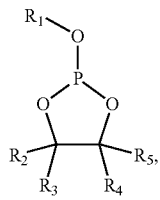

(I)

wherein,
   $R_1$ is an n-propoxy group, an iso-propoxy group, a tert-butoxy group, an n-pentafluoropropoxy group, an n-trifluoropropoxy group, an iso-hexafluoropropoxy group, or a tert-nonafluorobutoxy group, and
   $R_2$, $R_3$, $R_4$, and $R_5$ are each selected, independently of one another, from H, a trifluoromethyl group, or a $C_2$-$C_6$-alkyl group which is substituted with a trifluoromethyl group.

2. The electrolyte as recited in claim 1, wherein $R_1$ is the n-propoxy group, the iso-propoxy group, or the tert-butoxy group.

3. The electrolyte as recited in claim 2, wherein $R_1$ is the tert-butoxy group.

4. The electrolyte as recited in claim 1, wherein $R_1$ is the n-pentafluoropropoxy group.

5. The electrolyte as recited in claim 1, wherein,
   $R_2$ is the trifluoromethyl group, and
   $R_3$, $R_4$, and $R_5$ are each H.

6. The electrolyte as recited in claim 1, wherein $R_2$, $R_3$, $R_4$, and $R_5$ are each H.

7. The electrolyte as recited in claim 1, wherein the electrolyte comprises 0.1 to 15 wt.-% of the at least one phosphite relative to a total weight of the at least one first organic solvent and the at least one second organic solvent.

8. A method of using an electrolyte in a rechargeable lithium battery at a voltage above 4.2 V, the method comprising:
   providing the electrolyte comprising,
     at least one lithium salt,
     at least one first organic solvent having a dielectric constant of >90 at 40° C.,
     at least one second organic solvent having a boiling point of <110° C., and
     at least one phosphite having the formula (I)

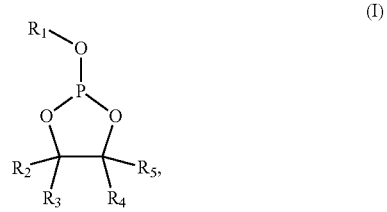

(I)

wherein,
   $R_1$ is a completely or partially halogen-substituted, linear or branched, $C_2$-$C_{20}$ alkyl group, and
   $R_2$, $R_3$, $R_4$, and $R_5$ are each selected, independently of one other, from H, or an unsubstituted or completely or partially halogen-substituted, linear or branched, $C_1$-$C_{20}$ alkyl group;
   providing the electrolyte as a part of the rechargeable lithium battery; and
   using the electrolyte in the rechargeable lithium battery at the voltage above 4.2 V.

9. A rechargeable lithium battery comprising:
   a cathode;
   an anode;
   a separator; and
   the electrolyte as recited in claim 1.

10. The rechargeable lithium battery as recited in claim 9, wherein the electrolyte comprises 0.1 to 15 wt.-% of the at least one phosphite relative to a total weight of the at least one first organic solvent and the at least one second organic solvent.

* * * * *